Dec. 8, 1936.　　　　　E. D. HALE　　　　　2,063,549
WIND WHEEL
Filed Jan. 17, 1935　　　2 Sheets-Sheet 2
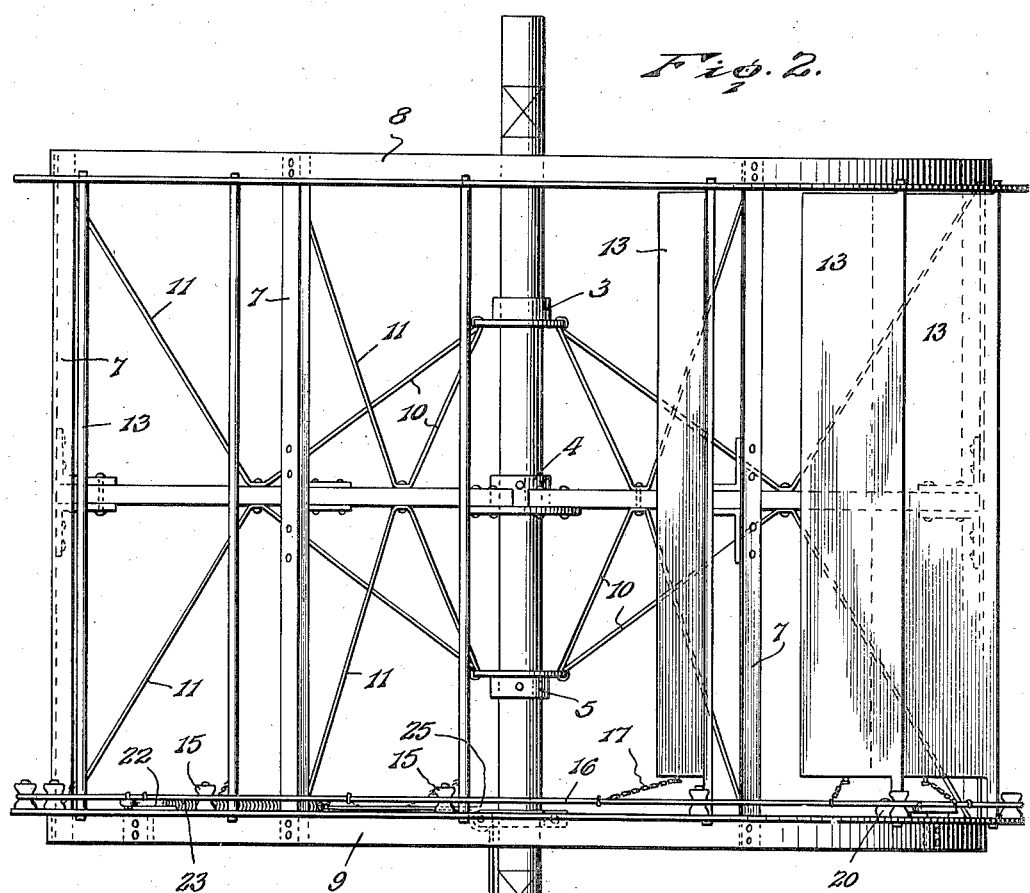
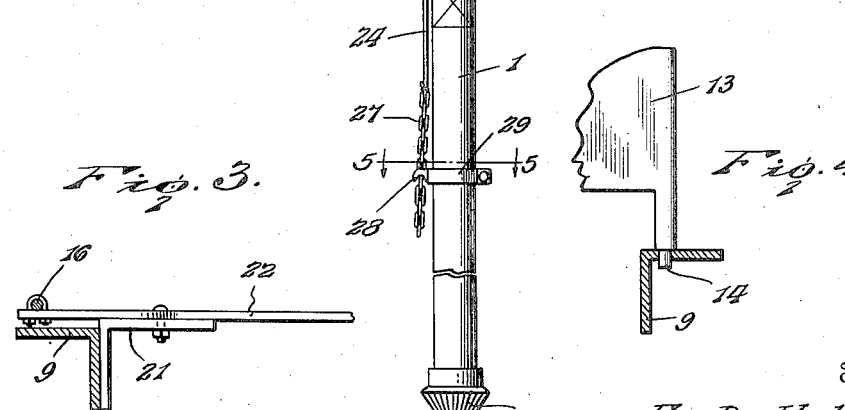
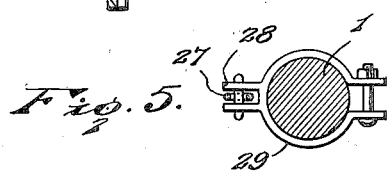
Inventor
E. D. Hale.
By Lacey & Lacey
Attorneys Patented Dec. 8, 1936

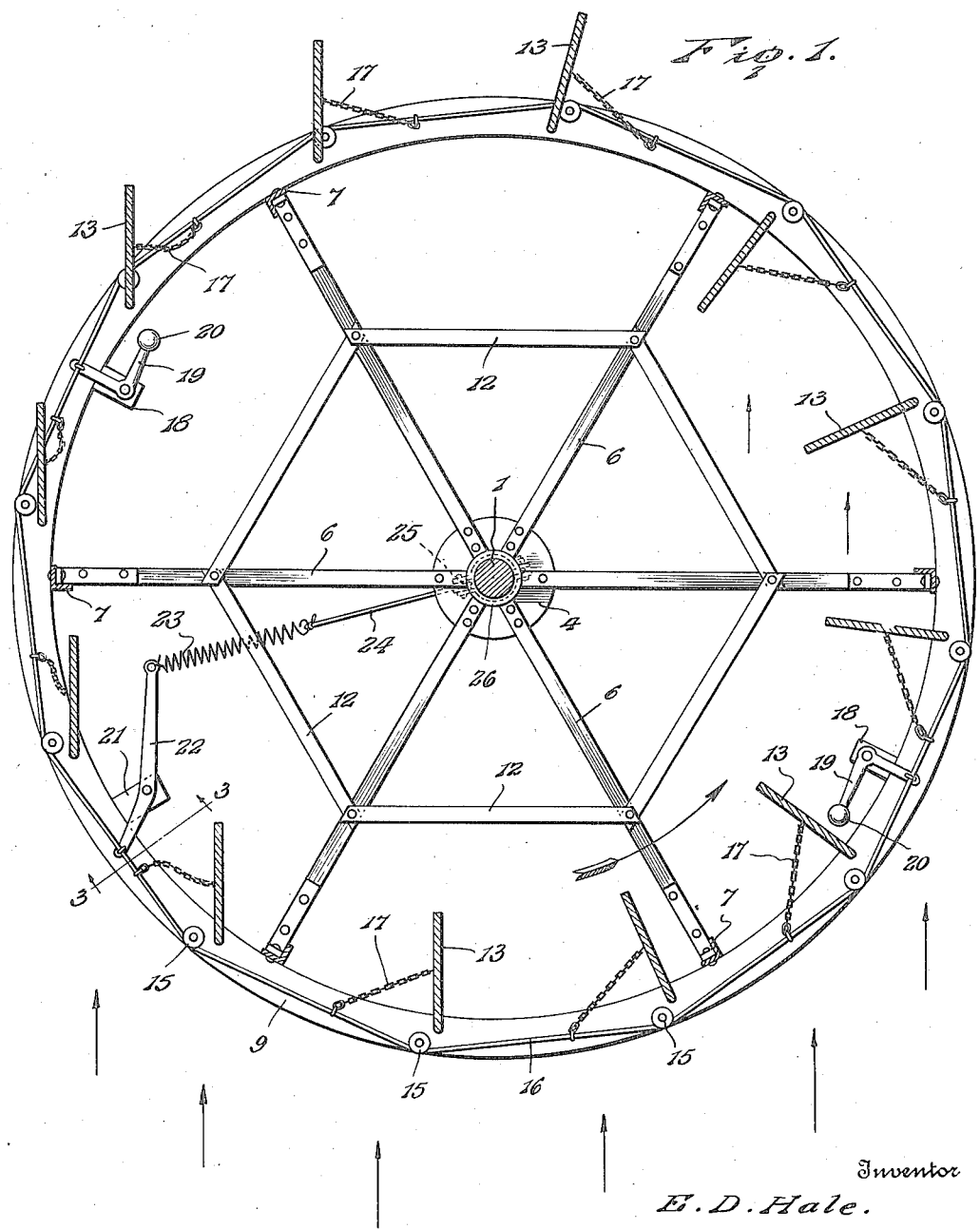

2,063,549

UNITED STATES PATENT OFFICE 2,063,549

WIND WHEEL

Elbert D. Hale, Glentana, Mont.

Application January 17, 1935, Serial No. 2,275

4 Claims. (Cl. 170—26)

This invention relates to wind motors, and has for its object the provision of a horizontally rotating wheel which may be actuated by the wind from any direction and in which the vanes or driving elements will automatically yield to the wind as they move against it. It is a particular object of the invention to provide simple and efficient means for adjusting the vanes and means for causing the wheel to rotate in an even steady manner. It is also an object of the present invention to provide a wheel of such construction that it will be strong and able to withstand the force of high winds without being so heavy that it will not rotate easily. The several stated objects, and other objects which will appear as the description proceeds, are attained in such a structure as is illustrated in the accompanying drawings, and the invention resides in certain novel features which will be particularly pointed out in the appended claims.

In the drawings:

Figure 1 is a horizontal section through a wind wheel embodying the invention;

Figure 2 is a side elevation of the same;

Figure 3 is an enlarged detail section on the line 3—3 of Figure 1;

Figure 4 is a detail showing the pivotal mounting of a vane;

Figure 5 is an enlarged detail section on the line 5—5 of Figure 2.

In carrying out the present invention, there is provided a vertical staff or shaft I which may be mounted in any convenient or approved manner within a derrick so as to rotate easily. The lower end of this shaft is equipped with a bevel gear 2, or other forms of gearing, whereby the power of the wind may be transmitted to machinery to be driven. At intervals in the height of the shaft I, collars 3, 4 and 5 are secured thereto, and extending from the middle collar 4 are spokes 6 which have their outer ends secured to posts 7, as shown. Said posts are secured at their ends to an upper rim 8 and a lower rim 9 which are preferably formed of angle bars, as shown most clearly in Figures 3 and 4, and are disposed concentric with the shaft I. Extending between the upper and lower collars 3 and 5 and the spokes 6 are bracing rods 10, and extending between the spokes and the several posts 7 are other bracing rods II, a very strong and rigid frame being thus attained. Other bracing bars 12 are extended between the spokes at points between the ends thereof, as shown clearly in Figure 1. The several collars being firmly secured to the shaft and the posts and rims being firmly secured to the ends of the spokes, any rotation of the frame which may be set up through the action of the wind will obviously be transmitted directly to the shaft so that the shaft will be likewise rotated and power generated for transmission to the machinery to be driven.

The vanes 13 may be provided in any desired or suitable number and are disposed vertically between the upper and lower rims and are provided at their ends with studs or trunnions 14 which are fitted through openings or bearings provided therefor in the respective rims so that the vanes may easily turn. Mounted upon the lower rim are idlers or guide rollers 15 arranged preferably one adjacent the pivot of each vane, and a cable 16 is passed around the entire series of idlers at the outer sides of the same, as clearly shown in Figure 2. A series of short chains or other flexible connections 17 are extended between the respective vanes 13 and the cable, as clearly shown in Figure 1, so that the movement of the vanes in a direction away from the adjacent portions of the cable will be restricted and the vanes cannot move beyond a point where the chains are drawn taut. The chains are to be attached to the cable at such points that, when taut, they will be nearly in line with the cable. Brackets 18 are secured to the inner side of the lower rim, preferably at diametrically opposite points thereof, and upon these brackets are fulcrumed governor levers 19 each equipped with a weight 20. It will be readily noted that the governor levers are in the form of bell cranks or angle levers, and the weights 20 are at the ends of the inner or free arms of said levers, while the outwardly extending arms of the levers are connected to the cable 16. At any convenient point along the rim 9 there is also secured a bracket 21, corresponding to the brackets 18, and upon said bracket 21 is pivoted a lever 22 which has its outer end attached to the cable 16 and its inner end engaged by one end of an expansion spring 23. The inner end of the spring 23 is attached to a cable 24 which passes inwardly to a guide roller 25 mounted in a strap or other convenient form of bearing 26 secured upon the shaft I. From said guide roller 25 the cable extends downwardly alongside the shaft I, as clearly shown in Figure 2, and at the end of the cable is suspended a short chain 27 which is adapted to engage under a pair of hooks 28 formed on the end of a split collar 29 which clamped about the shaft, as shown and as will be understood.

The construction and arrangement of the several parts of the wind wheel having been thus made known, it is thought the operation and advantages of the same will be readily understood. Assuming that the wind is blowing upwardly in Figure 1, it will act upon the several vanes at the lower left of the figure so that said vanes will extend parallel with the wind currents and present their pivoted edges thereto. The vanes at the right of the figure will be prevented from swinging into parallelism with the wind currents by the respective chains 17 and, consequently, these vanes will be held against the wind so that they will be driven toward the top of the figure and the movement thereof will be transmitted to the rims and other parts of the frame so that the wheel will be rotated in the direction indicated by the large arrow. As the vanes reach the upper portion of the figure, their pivoted edges will be carried beyond their feathered edges and they will be swung outwardly with respect to the rims so that the wind currents acting thereon will play upon the leading faces of the vanes instead of upon the trailing faces thereof and the vanes will, consequently, be swung into the parallel positions shown at the upper left of the figure to extend in the direction of the wind instead of at an angle thereto. The vanes will thus be feathered so that at the left side of the figure they will present their edges to the wind and, consequently, will not block the movement of the wheel. It will be seen that the chains 17 cooperate with the vanes 13 and the cable 16 for automatically disposing said vanes in the path of the wind so that the utmost utility from said wind flow will be utilized. The governor levers 19 will also assist in retaining the vanes in proper position. If it be desired manually to limit the extent to which the vanes may open under the force of the wind, a pull is exerted through the chain 27, cable 24 and spring 23 upon the lever 22 so that the outer end of the lever will exert a pull upon the cable 16 and draw the several attached chains 17 in a direction away from the pivots of the vanes to which they are respectively attached so that the vanes will be held more closely to a closed or inoperative position. The spring 23 serves to cushion the action of the cable upon the lever 22 so that it will not adjust the several chains with a jerky motion but will act upon them smoothly. The governor levers 19 act upon the cable 16 in opposition to the adjusting lever 22 and serve to eliminate all jerking or violent movement of the vanes and the wheel. The construction of the wheel is very simple but strong and durable and the full force of the wind may be utilized to generate power for operating various machines.

Having thus described the invention, what is claimed as new is:

1. A wind wheel comprising upper and lower rims, a central vertical shaft, means for connecting the rims to the shaft, vanes pivoted in and extending between the rims, guides on the lower rim, a cable trained about said guides at the outer sides of the same, flexible connections between the cable and the respective vanes, an adjusting lever mounted upon the rim at the inner side of said cable and connected with the cable, and resilient means attached to the lever for setting the same.

2. A wind wheel comprising upper and lower rims, a central vertical shaft, means for securing the rims to the shaft, vanes pivoted in and extending between the rims, a cable extending around the lower rim and guided thereon, flexible connections between said cable and the respective vanes, an adjusting lever mounted upon the rim and attached at one end to the cable, a second cable, a yieldable connection between said second cable and the inner end of the adjusting lever, and means upon the shaft for holding said second cable in a set position.

3. A wind wheel comprising a central vertical shaft, upper and lower rims disposed concentric with the shaft and connected therewith, vanes pivoted in and extending between the rims, an adjusting cable carried by the lower rim, flexible connections between said cable and the respective vanes, an adjusting element connected with the cable and operable from a point below the lower rim, and governor levers mounted on the lower rim and connected with the cable to act thereon in opposition to said adjusting element.

4. A wind wheel comprising a central shaft, a pair of spaced rims disposed on the shaft concentric therewith, said rims being connected with the shaft, vanes pivoted in and extending between the rims, an adjusting cable carried by one of the rims, flexible connections between said cable and the respective vanes, an adjusting element connected with the cable and operable from a point below said last mentioned rim, and governor levers mounted on said last mentioned rim and being connected with the cable to act thereon in opposition to said adjusting element.

ELBERT D. HALE.